(12) United States Patent
Endo et al.

(10) Patent No.: US 7,944,111 B2
(45) Date of Patent: May 17, 2011

(54) STATOR AND MOTOR

(75) Inventors: Yasuhiro Endo, Okazaki (JP);
Kazutaka Tatematsu, Nagoya (JP);
Yutaka Komatsu, Nagoya (JP)

(73) Assignees: Toyota Jidosha Kabushiki Kaisha,
Aichi-ken (JP); Sumitomo Electric Industries, Ltd., Osaka (JP)

( * ) Notice: Subject to any disclaimer, the term of this patent is extended or adjusted under 35 U.S.C. 154(b) by 129 days.

(21) Appl. No.: 12/305,138

(22) PCT Filed: Jun. 14, 2007

(86) PCT No.: PCT/JP2007/062472
§ 371 (c)(1),
(2), (4) Date: Dec. 16, 2008

(87) PCT Pub. No.: WO2007/145374
PCT Pub. Date: Dec. 21, 2007

(65) Prior Publication Data
US 2009/0273245 A1    Nov. 5, 2009

(30) Foreign Application Priority Data
Jun. 16, 2006   (JP) .................................. 2006-167142

(51) Int. Cl.
*H02K 1/06* (2006.01)
(52) U.S. Cl. ............................................... 310/216.058
(58) Field of Classification Search ........... 310/216.008, 310/216.009, 216.058, 216.059, 216.067, 310/216.126, 216.129, 216.135
See application file for complete search history.

(56) References Cited

U.S. PATENT DOCUMENTS

| | | | |
|---|---|---|---|
| 4,392,072 A | 7/1983 | Rosenberry | |
| 5,382,859 A * | 1/1995 | Huang et al. | 310/216.008 |
| 5,592,731 A | 1/1997 | Huang et al. | |
| 6,093,984 A | 7/2000 | Shiga et al. | |
| 6,226,856 B1 | 5/2001 | Kazama et al. | |
| 6,504,284 B1 | 1/2003 | Kazama et al. | |
| 7,714,476 B2 * | 5/2010 | Hoshina et al. | 310/216.113 |
| 2001/0005933 A1 | 7/2001 | Kazama et al. | |
| 2004/0051417 A1 | 3/2004 | Yamazaki et al. | |
| 2004/0222715 A1 | 11/2004 | Yamamura et al. | |
| 2005/0229383 A1 | 10/2005 | Yamamura et al. | |
| 2007/0241630 A1* | 10/2007 | Holmes et al. | 310/217 |

FOREIGN PATENT DOCUMENTS
CN    1245993 A    3/2000
(Continued)

OTHER PUBLICATIONS
German Office Action dated Aug. 18, 2010.
(Continued)

*Primary Examiner* — Nguyen N Hanh
(74) *Attorney, Agent, or Firm* — Sughrue Mion, PLLC

(57) ABSTRACT

A stator core is formed by arranging divided cores (20) in a circumference direction in cylindrical shape. On an upper end surface (60) of a core back (50) of the divided core, holes (62, 64) are made. Then, on the upper end surface, a reinforcing ring (40) having through holes (66, 68) is arranged, and is connected with rivets (70, 72). Thus, stress is transmitted not only through a side surface (58) but also through the reinforcing ring (40), between the adjacent divided cores. Thus, strength of the stator using a powder magnetic core is ensured and a space is saved.

17 Claims, 5 Drawing Sheets

FOREIGN PATENT DOCUMENTS

| | | |
|---|---|---|
| DE | 69322167 T2 | 6/1999 |
| DE | 20217109 U1 | 4/2004 |
| DE | 102004021788 A1 | 12/2004 |
| JP | 08-505036 A | 5/1996 |
| JP | 11-127549 A | 5/1999 |
| JP | 11-275830 A | 10/1999 |
| JP | 2001-025185 A | 1/2001 |
| JP | 2001-045684 A | 2/2001 |
| JP | 2001-504677 A | 4/2001 |
| JP | 3350889 B2 | 9/2002 |
| JP | 2003-079077 A | 3/2003 |
| JP | 2003-224940 A | 8/2003 |
| JP | 2003-274579 A | 9/2003 |
| JP | 2004-236497 A | 8/2004 |
| JP | 2004-328965 A | 11/2004 |
| JP | 2005-039992 A | 2/2005 |
| WO | 94/06192 A1 | 3/1994 |
| WO | 98/20595 A1 | 5/1998 |
| WO | 9954985 | 10/1999 |

OTHER PUBLICATIONS

Chinese Office Action issued in corresponding Application No. 200780022587.4, dated Dec. 31, 2010.

German Office Action dated Jan. 26, 2011.

* cited by examiner

STATOR AND MOTOR

TECHNICAL FIELD

The present invention generally relates to a stator used for a motor, and more particularly to a technique for constructing a stator using a powder magnetic core.

BACKGROUND ART

Japanese Patent Laid-Open Publication No. 2004-328965 discloses a technique for constructing a stator by using divided cores formed by sintering magnetic powder. Specifically, a stator is assembled by alternately arranging trapezoidal divided cores.

Japanese Patent Laid-Open Publication No. 2003-224940 discloses a technique for constructing a stator by engaging a concave part of a tooth with a convex part provided on the inner peripheral surface of a ring-shaped core back. In this technique, at least either one of the core back and the tooth is formed of magnetic powder.

Japanese Patent Laid-Open Publication No. 2005-39992 discloses a technique for constructing a stator by combining a plurality of divided cores each having a tooth. In this technique, an arcuate concave part is provided on one side surface of the divided core, and an arcuate convex part is provided on the other side surface thereof, by which the adjacent divided cores are engaged with each other to receive an external force over a large-area surface, and thereby preventing stress concentration. Each of the divided cores is made by building up laminate materials.

Japanese Patent Laid-Open Publication No. Hei11-275830 discloses a technique for fixing a lapped part of the adjacent divided cores to a frame with bolts. In this technique, surfaces serving as paths of magnetic flux are securely brought into contact with each other to allow the magnetic flux to pass therethrough easily.

Japanese Patent Laid-Open Publication No. Hei11-127549 describes a technique for fixing a stator by engaging a plurality of teeth with a cylindrical core back.

A powder magnetic core has insufficient strength against high stress, because the use of a low-loss material decreases the strength. However, the aforementioned patent documents do not disclose a technique for decreasing stress acting on the powder magnetic core.

DISCLOSURE OF THE INVENTION

An advantage of the present invention is to prevent stress concentration on a stator using a powder magnetic core.

Another advantage of the present invention is to establish a technique for achieving both ensuring strength of a stator using a powder magnetic core and space saving of the stator.

The stator according to the present invention includes a stator core configured into a cylindrical shape, in which a plurality of divided cores formed by a powder magnetic core are arranged in the circumferential direction; and a reinforcing member connected to the divided cores, the reinforcing member being a ring-shaped member corresponding to the cylindrical shape of the stator core and being made of a material having a strength higher than that of the powder magnetic core.

The stator is a part used in a motor. In the motor, a rotor is rotated by electromagnetic action between the rotor and the stator. The stator is disposed so as to surround the rotor (usually, on the outside of the rotor).

The stator includes the stator core for producing a magnetic flux (magnetic field) acting on the rotor, and the reinforcing member for reinforcing the strength of the stator core. The reinforcing member can serve as a part of the path for the magnetic flux. The stator core includes a plurality of teeth, and core backs provided at the back of the teeth. A coil is wound around each of the teeth, and a proper current is caused to flow in the coil, so that the tooth functions as a magnetic pole. Also, the core back is provided at the back of each of the teeth, and functions as the path for magnetic flux between the teeth. The stator core is formed into a cylindrical shape by arranging the divided cores in the circumferential direction in a cylindrical form.

The divided core usually includes at least one tooth, and the core back at the back thereof. The divided core is made by the formation of a powder magnetic core. Typically, by solidifying the powder magnetic core containing magnetic powder such as iron powder and an insulating material such as a resin by means of a die, the divided core having a shape corresponding to the die is formed. In the molding operation, annexed treatment such as sintering or annealing may be performed. In manufacturing the divided core, from the viewpoint of simplification of manufacturing procedure, it is desirable to form the tooth and the core back integrally. However, for example, from the viewpoint of ease of winding a coil around the tooth, the divided core can be manufactured by forming the tooth and the core back separately and assembling the tooth to the core back after a coil has been wound around the tooth.

The reinforcing member is made into a ring shape corresponding to the shape of stator core (the shape of the reinforcing member may be a cylindrical shape similar to the shape of the stator, but it is called a ring shape in the sense that a shape that does not have a thickness as large as the thickness of the stator is also included). The reinforcing member is connected to the core back of individual divided core, by which it plays a role in reinforcing the strength of stator. The reinforcing member is made of a material having a strength higher than that of the powder magnetic core. A member having a strength higher than that of the powder magnetic core means a member having a high strength per unit area, unit volume, or unit mass. In this specification, strength is defined as a degree to which an object is less liable to be subjected to elastic or plastic deformation by a proper external force, or a degree to which an object is not broken. As examples of strength, tensile strength withstanding a tensile force, compressive strength withstanding a compressive force, shear strength withstanding a shearing force, and the like can be cited. The material having a strength higher than that of the powder magnetic core is changed relatively by the properties of powder magnetic core, but still exemplifying such materials, cold-rolled steel sheets (SPCC), aluminum, duralumin, and the like can be cited.

The powder magnetic core generally has a property such that the compressive strength is relatively high, but the tensile strength is relatively low. From this point of view, it can be said that it is effective that a member having a relatively high tensile strength is used as the reinforcing member, and also it is effective that the reinforcing member and the stator core are connected to each other so as to absorb the tensile force acting on the powder magnetic core. Further, the powder magnetic core generally has a property such that the strength decreases under high stress. From this point of view, it is thought desirable that a member whose strength does not decrease under high stress be used as the reinforcing member. Also, it can be said. that the reinforcing member and the stator core are preferably connected to each other so as to absorb the stress acting on the powder magnetic core.

According to this configuration, the stresses acting on the divided cores can be distributed by the reinforcing member, so that a stator having high strength can be manufactured as compared with the case where the reinforcing member is not used. In particular, by using a material whose strength does not decrease under high stress as the reinforcing member, a stator (and a motor) that achieve both of some degree of strength and some degree of space-saving property (or light weight) can be manufactured.

In one mode of the stator in accordance with the present invention, the divided core and the reinforcing member are connected to each other by means of a connecting member made of a material having a strength higher than that of the powder magnetic core. The connecting member means a third member used for connection. As examples of the connecting member, a rivet (pin), a bolt, a staking member, and the like can be cited. Further, treatment for making the connection rigid may be performed: for example, the rivet and the reinforcing member may be welded to each other.

In one mode of the stator according to the present invention, the divided core and the reinforcing member are each provided with a hole structure, and the divided core and the reinforcing member are connected to each other by inserting the connecting member into the hole structure. In particular, in the case where the connecting member is inserted into the hole structure by press-fitting (driving) or screwing, an effect of enhancing strength can be anticipated. As the connecting member, a slender straight-line shaped member such as a rivet or a bolt is used, from the viewpoint of ease of insertion into the hole. However, a U-shaped member or the like may also be used.

In one mode of the stator according to the present invention, the hole structure provided in the divided core is formed integrally at the time of the formation of divided core. Thereby, the need for forming the hole structure by later fabrication is eliminated. This mode cannot be employed in the case where the stator is manufactured by laminating flat rolled magnetic steel sheets. It can be said that this mode offers an advantage capable of being provided only when the powder magnetic core is used.

In one mode of the stator according to the present invention, the hole structure provided in the divided core is formed so as to be approximately perpendicular to the surface of the divided core. The connecting member is inserted so as to be approximately perpendicular to the surface of the divided core. The phrase "approximately perpendicular" means being at an angle within 10 degrees, preferably within about 3 degrees, from a perpendicular. Thereby, generally, stress is caused to act on the surface of stator core in a relatively well-balanced state. Also, in one mode of the stator according to the present invention, the hole structure provided in the divided core is formed so as to be approximately perpendicular to the rounding direction of a rotor paired with the stator. The connecting member is inserted so as to be approximately perpendicular to the rounding direction of the rotor. Thereby, the connecting member is subjected to a force from the direction perpendicular to the rotation reaction force (torque) received by the stator. Therefore, even when the rotor rotates in either direction or even at the time of acceleration or deceleration, a force can be stably transmitted from the divided core to the connecting member (and to the reinforcing member). Unlike this configuration, the connecting member can be inserted slantwise. Thereby, a force from either one of the front and the rear in the rotation direction can be received sufficiently. The connecting members may be inserted in different slantwise directions so that forces from both directions in the rotation direction can be received sufficiently.

In one mode of the stator in accordance with the present invention, the divided core and the reinforcing member are each provided with a corresponding engaging structure, and the divided core and the reinforcing member are connected to each other by the engagement of the engaging structures. Specifically, a protrusion part (a protrusion band or a protrusion group may also be used) is provided on at least one of the divided core and the reinforcing member, and a hole part (a through hole or a groove may also be used) is provided in the other thereof, by which connection is made by engaging the protrusion part with the hole part. To make the connection rigid, an adhesive may be used. Also, in one mode of the stator according to the present invention, the engaging structure provided in the divided core is formed integrally at the time of the formation of the divided core.

In one mode of the stator according to the present invention, the divided core is connected to an adjacent divided core, and the divided core and the reinforcing member are connected to each other at one location. In this configuration, since the divided cores are connected to each other, even if the reinforcing member and the core back of the divided core are connected at one location, vibrations, a positional shift, and the like of the divided core can be restrained. The phrase "connected at one location" means "connected in a certain part of the whole of a connectable region." The connection part may be not one point and may have some degree of spread, but a great spread in a linear or planar form is not assumed. In the case where the divided core and the reinforcing member are connected to each other at one location, the treatment for connection is easy. Also, in one mode of the stator according to the present invention, the divided core and the adjacent divided core each are provided with a corresponding core-to-core engaging structure, the divided core and the adjacent divided core are connected to each other by the engagement of the core-to-core engaging structures, and the core-to-core engaging structure is formed integrally at the time of the formation of the divided core.

In one mode of the stator in accordance with the present invention, the reinforcing member is arranged on the cylindrical end surfaces of the stator core (and the end surfaces of the divided cores). The end surface means a surface at an end of a cylindrical shape. A part of the reinforcing member may be spread to the side surface. However, the arrangement of reinforcing member on the end surfaces only is advantageous in reducing the size (saving space).

In one mode of the stator according to the present invention, the reinforcing member is arranged on only one cylindrical end surface of the stator core. Generally, if the reinforcing member is provided on only one end surface, it is thought that a sufficient strength can be ensured, and also the assembling work is easy. However, in the case where importance is placed on balance or in the case where a sufficient strength cannot be ensured, it is also effective that instead of this configuration, the reinforcing member is provided at both ends.

In one mode of the stator according to the present invention, the reinforcing member is arranged on the cylindrical outer peripheral surface of the stator core. The reinforcing member may cover the entirety of the outer peripheral surface, or may cover only a part thereof (that is, the reinforcing member is made so as to have a narrow width).

In one mode of the stator according to the present invention, the divided core and the reinforcing member are connected to each other at two locations or three or more locations. This configuration is especially effective in the case where the adjacent divided core is not connected. That is to say, even if the adjacent divided core is not connected, the degree of freedom of movement of the divided core can be restricted, and the positional shift thereof can be restrained. In the case where the divided core and the reinforcing member are connected to each other at two locations, the connection is relatively simple. The connection at three locations (especially, three locations forming a triangle) is effective in that the degree of freedom of movement can be restricted severely.

The motor according to the present invention includes the above-mentioned stator and a rotor arranged on the inside of the stator. The use of the above-mentioned stator can realize a motor having a relatively high strength and a small size.

The above-described modes of the present invention can be combined appropriately. For example, the stator used in the invention of above-mentioned motor may be any of the above-mentioned stators. Also, the stator may be a stator having the features of the above-mentioned two or more stators.

BEST MODE FOR CARRYING OUT THE INVENTION

Figure 1:
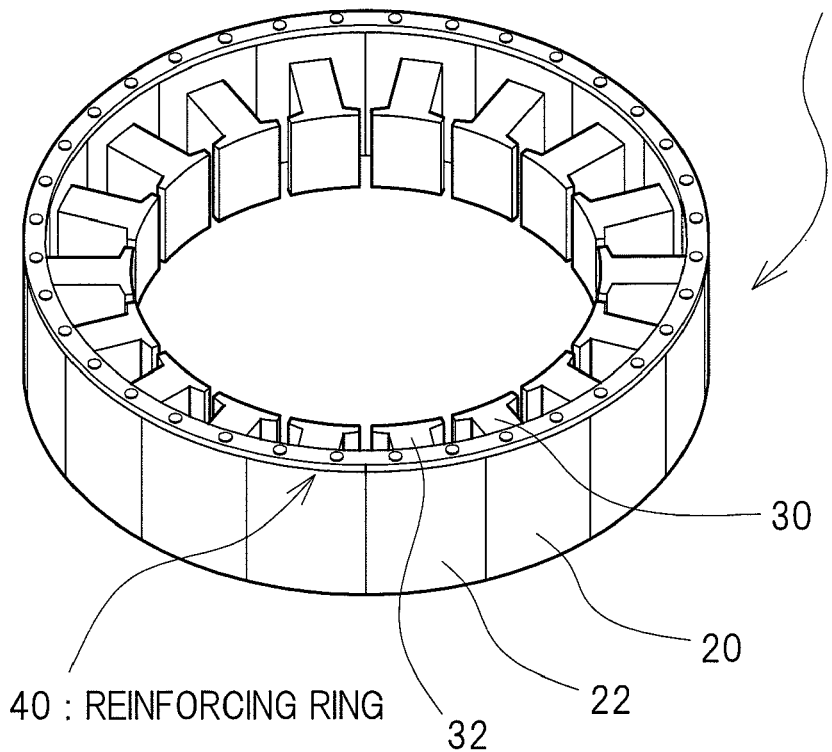
FIG. 1 is a perspective view showing an example schematic configuration of a stator.

FIG. 1 is a perspective view showing a schematic configuration of a stator 10 in according to an embodiment. The stator 10 is made into a cylindrical shape. In the center of the stator 10, a rotor is arranged to form a motor.

The stator 10 includes a stator core 12, and the stator core 12 is made by arranging eighteen divided cores 20, 22, . . . in the circumferential direction. Each of the divided cores 20, 22, . . . includes a core back (also called a yoke) constituting the cylindrical outer wall of the stator core 12, and a tooth 30, 32, . . . projecting to the inside from the core back. The tooth 30, 32, . . . functions as a magnetic pole for controlling the rotational motion of the rotor by means of a coil wound around the tooth and a current caused to flow in the coil, and the core back functions as a path for magnetic flux extending between the magnetic poles.

At the upper end of the stator core 12, a reinforcing ring 40 made of a cold-rolled steel sheet, which serves as a reinforcing member, is arranged. The reinforcing ring 40 is connected to the core back of the divided core 20, 22, . . . In this example, no reinforcing ring is arranged at the lower end of the stator core 12. The reasons for this are that a necessary strength can be ensured by only the reinforcing ring 40 at the upper end, and that the arrangement of only the reinforcing ring 40 at the upper end provides ease of assembly and space savings.

Figure 2:
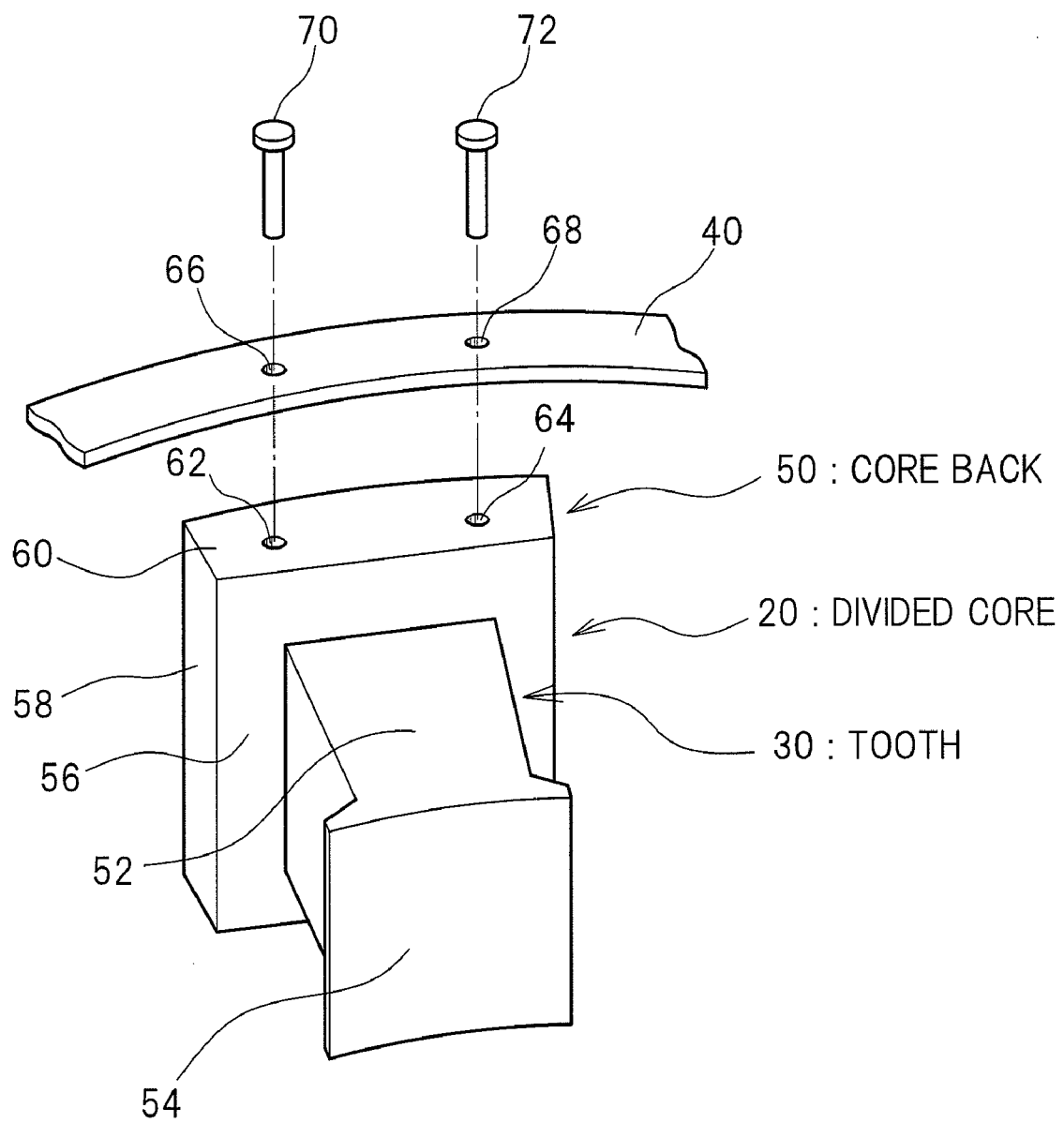
FIG. 2 is an exploded view of a divided core constituting the stator shown in FIG. 1.

FIG. 2 is an exploded view showing a part of the stator core 12 shown in FIG. 1. FIG. 2 shows one divided core 20, a part of the reinforcing ring 40, and rivets 70 and 72 for connecting these elements to each other.

The divided core 20 includes a protrusion-shaped tooth 30 and a plate-shaped core back 50 located at the back of the tooth 30. The tooth 30 consists of a column part 52 projecting from a portion near the center of an inner wall surface 56 of the core back 50, and a wide arch surface part 54 provided at the tip end of the column part 52. The column part 52 is made so as to be narrower than the inner wall surface 56, and a coil is wound around the column part 52. Also, the arch surface part 54 is formed into an arcuate shape so as to come close to the rotor arranged on the inside thereof.

A side surface 58 of the core back 50 is made so as to be flat, and is arranged so as to come into contact with the core back of the adjacent divided core, but is not directly connected thereto. An upper end surface 60 of the core back 50 is also made so as to be flat, and is in close contact with the flat lower surface of the reinforcing ring 40. Also, in the upper end surface 60 of the core back 50, two holes 62 and 64 are formed with a space therebetween, and the reinforcing ring 40 is formed with corresponding through holes 66 and 68. The rivets 70 and 72 penetrate the through holes 66 and 68 and are press fitted in the holes 62 and 64, respectively, to fix the reinforcing ring 40 and the divided core 20 to each other in a closely contacting form. Therefore, a shearing force acts on the core back 50 through the rivets 70 and 72, so that some stress is relaxed. It is also effective that the rivets 70 and 72 and the reinforcing ring 40 are integrated by welding before or after the rivets 70 and 72 are press-fitted in the holes 62 and 64 to enhance the connection therebetween. The two holes 62 and 64 are formed so as to be perpendicular to the upper end surface 60 of the core back 50, so that the rivets 70 and 72 are inserted perpendicularly to the upper end surface 60 of the core back 50. Therefore, the rivets 70 and 72 receive a transverse force (a force in the direction perpendicular to the rivet) from the core back 50 at the time of acceleration and deceleration and at the time of normal rotation and reverse rotation.

The divided core 20 shown in FIG. 2 is made at a single time by the formation of a powder magnetic core. That is to say, the tooth 30, the core back 50, and the holes 62 and 64 are formed at the same time. Also, the adjacent divided core also has the same shape as that of the divided core 20 shown in FIG. 2, and is made by the formation of the powder magnetic core in the same way. The divided cores are fixed to the reinforcing ring 40 by the rivets after a coil is wound around each of the teeth. The stator 10 thus manufactured is installed in a motor housing together with the rotor manufactured separately, by which the motor is manufactured.

The motor is driven by supplying a proper current to the coil. Thereby, magnetic interaction is produced between the magnetic poles of the divided cores and the rotor, whereby the rotor is accelerated or decelerated. At this time, the divided cores receive a reaction force caused by the magnetic interaction. This reaction force acts as stress in the divided cores.

Generally, the strength of powder magnetic core tends to be decreased by the use of a low-loss material. On the other hand, each divided core; that is, the stator core in which the divided cores are arranged, is required to have a strength sufficient to withstand stress caused by sudden acceleration or deceleration. However, for the powder magnetic core, the strength, especially the strength against elongation, is low as compared with a flat rolled magnetic steel sheet. Therefore, there arises the necessity of increasing the size of stator core or taking other measures to enhance the strength.

However, in the stator 10 shown in FIGS. 1 and 2, since the divided cores are connected to the reinforcing ring 40, the stress acting on the divided cores is distributed to a wide range not only through the contact surface with the adjacent divided core but also through the reinforcing ring 40. That is to say, the stress acting on the divided cores decreases, and the strength required by the divided cores may be low. Also, the reinforcing ring 40 on which the stress from the divided cores acts is made by using a cold-rolled steel sheet having high strength properties. Therefore, a necessary strength can be ensured by a small cross-sectional area as compared with the case where the powder magnetic core is used for reinforcement. That is to say, the stator 10 can be made so as to be small in size as compared with the case where the stator 10 is formed mainly by the powder magnetic core.

Successively, a modified example is explained with reference to FIGS. 3 to 5.

Figure 3:
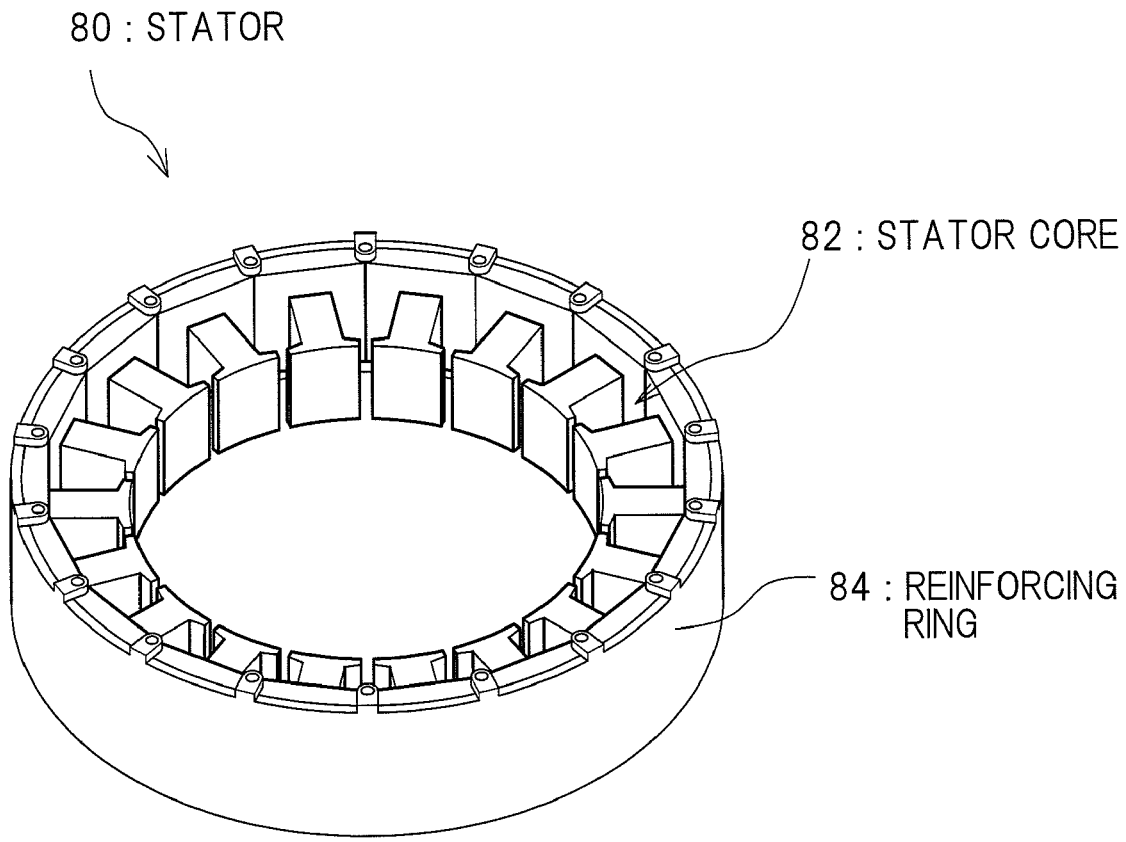
FIG. 3 is a perspective view showing a schematic configuration of a stator of a modified example.

FIG. 3 is a perspective view showing a schematic configuration of a stator 80 of the modified example. The stator 80 is manufactured in almost the same way as the stator 10 shown in FIG. 1. Specifically, eighteen divided cores made by the formation of the powder magnetic core are arranged in a cylindrical form to manufacture a stator core 82, and the stator core 82 is reinforced by a cylindrical reinforcing ring 84 made of a cold-rolled steel sheet. However, in the stator 80, unlike the stator 10, the reinforcing ring 84 is provided so as to cover the entire outer peripheral surface of the stator core 82. The reinforcing ring 84 is connected to the stator core 82 by the upper end surface of the reinforcing ring 84.

Figure 4:
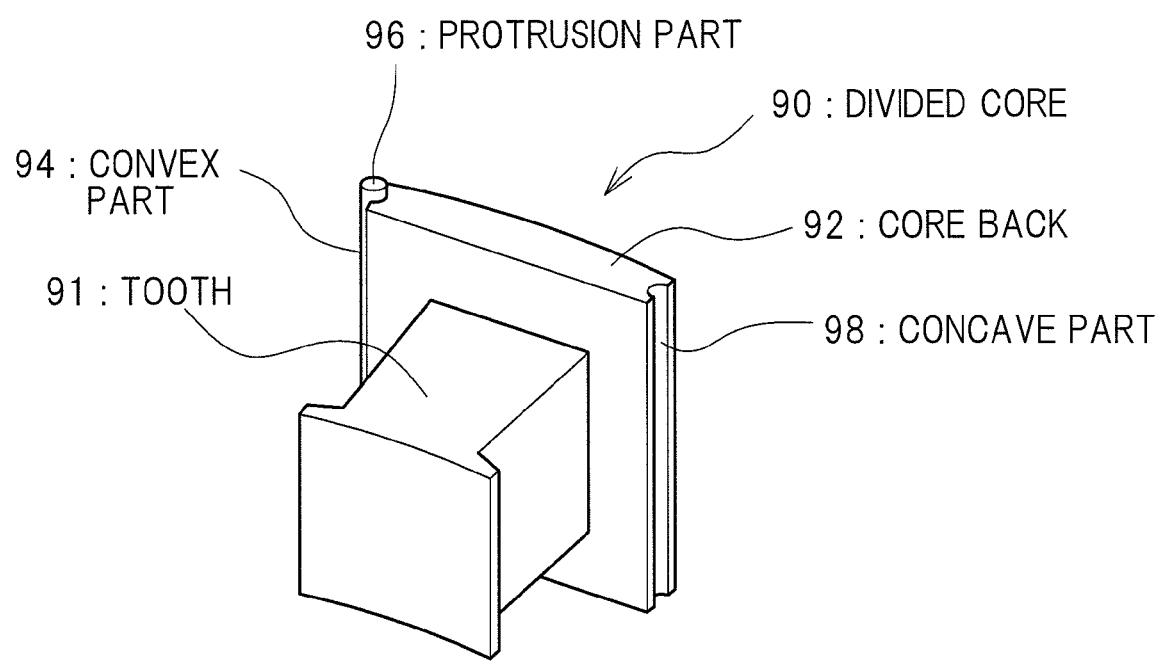
FIG. 4 is a perspective view of a divided core constituting the stator shown in FIG. 3.

FIG. 4 is a perspective view of one divided core 90 constituting the stator core 82. The divided core 90 is configured in almost the same way as the divided core 20 shown in FIG. 2, and includes a tooth 91 and a core back 92. However, no holes are formed in the upper end surface of the core back 92. Also, on one side surface of the core back 92, a columnar convex part 94 is provided ranging from the lower end to the upper end. On the upper end side thereof, a protrusion part 96 projecting upward from the upper end surface is provided at the tip end of the convex part 94. Further, on the other side surface of the core back 92, a concave part 98 depressed in a columnar form is provided ranging from the lower end to the upper end. The convex part 94, the protrusion part 96, and the concave part 98 are formed at the same time when the divided core 90 is formed by the formation of the powder magnetic core.

Other divided cores are formed in the same way as the divided core 90 shown in FIG. 4. Specifically, a convex part is formed on one side surface thereof, and a concave part is formed in the other side surface thereof. When the stator core 82 is assembled, by sliding the adjacent divided cores in the up and down direction, the convex part and the concave part are engaged with each other. That is to say, the stator core 82 is manufactured so as to be less liable to be deformed, because the adjacent divided cores are connected to each other.

Figure 5:
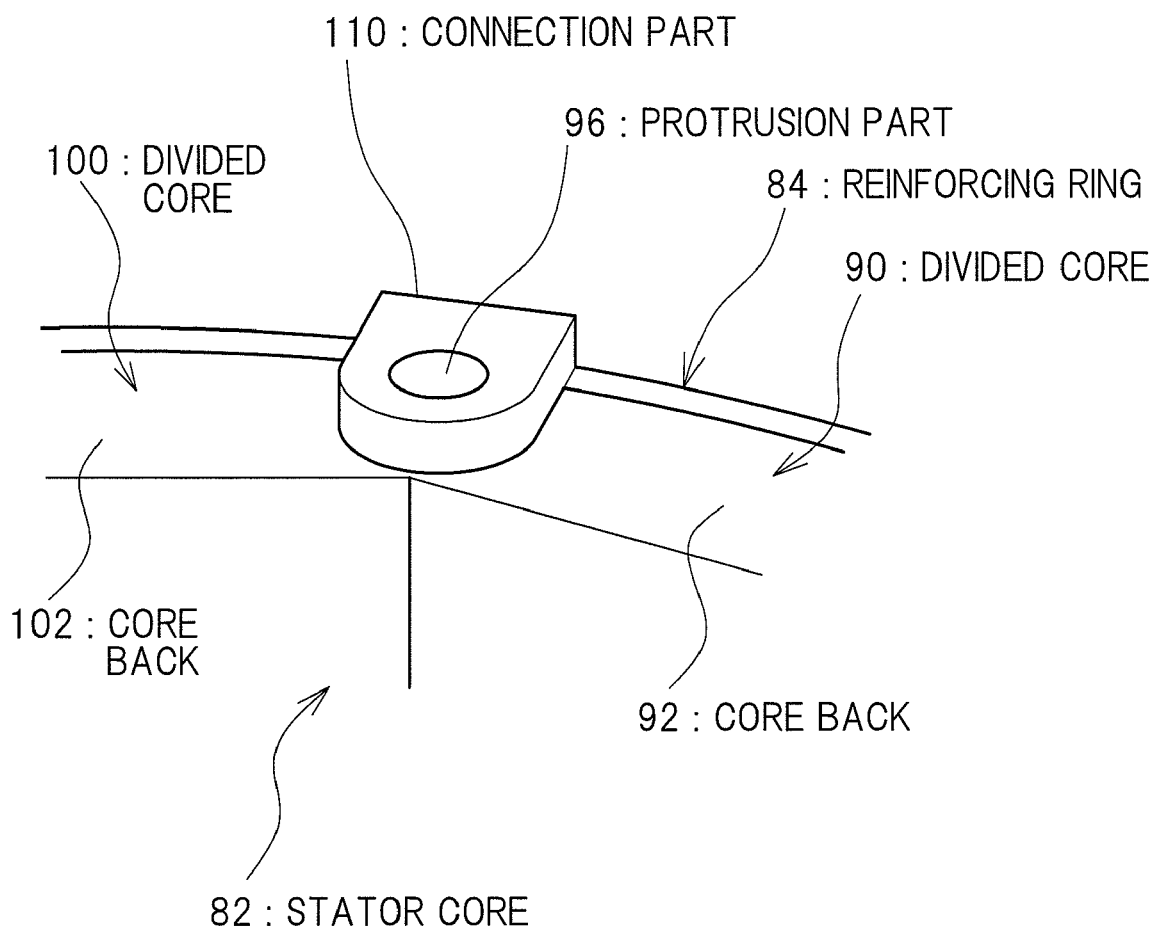
FIG. 5 is an explanatory view showing an example of connection between a divided core and a reinforcing ring of the stator shown in FIG. 3.

FIG. 5 is a partial perspective view for explaining a state in which the reinforcing ring 84 is connected to the stator core 82. FIG. 5 shows parts of the two adjacent divided cores 90 and 100 of the stator core 82. The divided cores 90 and 100 are fixed to each other in a closely contacting form by the convex part and the concave part being engaged with each other. The outside of the divided cores 90 and 100 is surrounded by the reinforcing ring 84.

The upper end surface of the stator core 82 is made flat by core backs 92 and 102 of the divided cores 90 and 100. However, at the boundary of the divided cores 90 and 100, the protrusion part 96 of the divided core 90 projects upward. To this protrusion part 96, a hole in a connection part 110 of the reinforcing ring 84 is fitted. The connection part 110 is formed integrally with the main part that covers the side surface of the stator core 82, and is bent to the inside at right angles to the main part. Therefore, the reinforcing ring 84 is connected to the stator core 82 by engaging the connection part 110 with the protrusion part 96.

For the stator 10 shown in FIGS. 1 and 2, the reinforcing ring 40 and the divided core are connected to each other at two locations by means of two rivets. In contrast, for the stator 80, the reinforcing ring 84 and the divided core are connected to each other at one location by means of one protrusion part. However, for the stator 80, the adjacent divided cores are engaged with each other, so that a play between the divided cores can be prevented. Also, the stator 80 is configured so that the whole inner peripheral surface of the reinforcing ring 84 is in contact with the entire outer peripheral surface of the stator core 82, so that an advantage that the entire shape is stabilized is also offered.

The embodiment described above can further be modified in various manners.

As one example, there can be cited a mode in which the reinforcing ring that covers the outer peripheral surface of the stator core 82 as shown in FIG. 3 is connected to the stator core with rivets. In the case where the rivets are used for connection, the configuration may be made such that a bent part such as the protrusion part 96 shown in FIG. 5 is provided on the reinforcing ring, and the upper end surface of the stator core and the bent part are connected to each other via a rivet. It is also effective that no bent part is provided, and rivets are press fitted in the outer peripheral surface of stator core to connect the reinforcing ring to the stator core.

Also, it is effective that the transmission locations of a force between the stator core and the reinforcing ring are distributed. In the case where the divided core and the reinforcing ring are connected to each other at only one location or two locations as in the example explained with reference to FIGS. 1 to 5, it is also thought that stress is concentrated in the divided core at the one or two locations. Therefore, it is effective that connection is made at three or more locations, or linear or planar connection is made to avoid stress concentration. Also, the stress can be distributed by changing the manner of contact, rather than by expanding the connecting location. For example, by making the contact surface between the divided core and the reinforcing ring into the same form, the stress can be transmitted through the contact surface. Further, it will be effective that the stress is distributed by increasing the diameters of rivets or protrusion parts or by increasing the overall lengths thereof.

The invention claimed is:

1. A stator comprising:
a stator core configured into a cylindrical shape, in which a plurality of divided cores formed by a powder magnetic core are arranged in the circumferential direction; and
a reinforcing member connected to the divided cores, the reinforcing member being a ring-shaped member corresponding to the cylindrical shape of the stator core and being made of a material having a strength higher than that of the powder magnetic core,
wherein
each of the divided cores is provided with an engaging structure used integrally for the connection to the adjacent divided core and the reinforcing member;
the reinforcing member is provided with an engaging structure corresponding to the engaging structure of the divided core; and
each of the divided cores is connected to the adjacent divided core and the reinforcing member by the engagement of these engaging structures.

2. The stator according to claim 1, wherein
each of the divided cores is connected to an adjacent divided core; and
each of the divided cores and the reinforcing member are connected to each other at one location.

3. The stator according to claim 2, wherein
the divided core and the adjacent divided core each are provided with a corresponding core-to-core engaging structure;
the divided core and the adjacent divided core are connected to each other by the engagement of the core-to-core engaging structures; and
the core-to-core engaging structure is formed integrally at the time of the formation of the divided core.

4. The stator according to claim 1, wherein
the reinforcing member is arranged on the cylindrical end surfaces of the stator core.

5. The stator according to claim 4, wherein
the reinforcing member is arranged on only one cylindrical end surface of the stator core.

6. The stator according to claim 1, wherein
the reinforcing member is arranged on the cylindrical outer peripheral surface of the stator core.

7. The stator according to claim 1, wherein each of the divided cores and the reinforcing member are connected to each other at two locations or three or more locations.

8. A motor comprising:
the stator described in claim 1; and
a rotor arranged on the inside of the stator.

9. A stator comprising:
a stator core configured into a cylindrical shape, in which a plurality of divided cores formed by a powder magnetic core are arranged in the circumferential direction; and
a reinforcing member connected to the divided cores, the reinforcing member being a ring-shaped member corresponding to the cylindrical shape of the stator core and being made of a material having a strength higher than that of the powder magnetic core,
wherein
each of the divided cores and the reinforcing member are connected to each other by using a connecting member made of a material having a strength higher than that of the powder magnetic core.

10. The stator according to claim 9, wherein
the divided core and the reinforcing member each are provided with a hole structure; and
each of the divided cores and the reinforcing member are connected to each other by inserting the connecting member into the hole structure.

11. The stator according to claim 10, wherein
the hole structure provided in the divided core is formed integrally at the time of the formation of the divided core.

12. The stator according to claim 10, wherein
the hole structure provided in the divided core is formed so as to be approximately perpendicular to the surface of the divided core.

13. The stator according to claim 10, wherein
the hole structure provided in the divided core is formed so as to be approximately perpendicular to the rounding direction of a rotor paired with the stator.

14. A stator comprising:
a stator core configured into a cylindrical shape, in which a plurality of divided cores formed by a powder magnetic core are arranged in the circumferential direction; and
a reinforcing member connected to the divided cores, the reinforcing member being a ring-shaped member corresponding to the cylindrical shape of the stator core and being made of a material having a strength higher than that of the powder magnetic core,
wherein
the divided core and the reinforcing member are each provided with a corresponding engaging structure; and
the divided core and the reinforcing member are connected to each other by the engagement of the engaging structures.

15. The stator according to claim 14, wherein
the engaging structure provided in the divided core is formed integrally at the time of the formation of the divided core.

16. A stator comprising:
a stator core configured into a cylindrical shape, in which a plurality of divided cores formed by a powder magnetic core are arranged in the circumferential direction; and
a reinforcing member connected to the divided cores, the reinforcing member being a ring-shaped member corresponding to the cylindrical shape of the stator core and being made of a material having a strength higher than that of the powder magnetic core,
wherein
each of the divided cores is provided with a convex protruding structure and a corresponding concave structure;
the reinforcing member is provided with a hole structure corresponding to the convex protruding structure;
each of the divided cores and the adjacent divided core are connected to each other by the engagement of the convex protruding structure with the concave structure; and
each of the divided cores and the reinforcing member are connected to each other by the engagement of the convex protruding structure with the hole structure.

17. The stator according to claim 16, wherein
the convex protruding structure includes a convex part extending in a convex form along one surface in the circumferential direction and a protrusion part projecting from the end surface of the divided core at the end of the convex part;
the concave structure includes a concave part extending in a concave form along the other surface in the circumference direction; and
the hole structure is provided on the end surface side of the divided core,
whereby the convex part and the concave part of the divided core are engaged with the concave part and the convex part of the adjacent divided core, respectively, and the protrusion part thereof is engaged with the hole structure of the reinforcing member.

* * * * *